Oct. 17, 1950 — C. J. NULPH — 2,526,265
SPRAY HEAD
Filed June 23, 1947
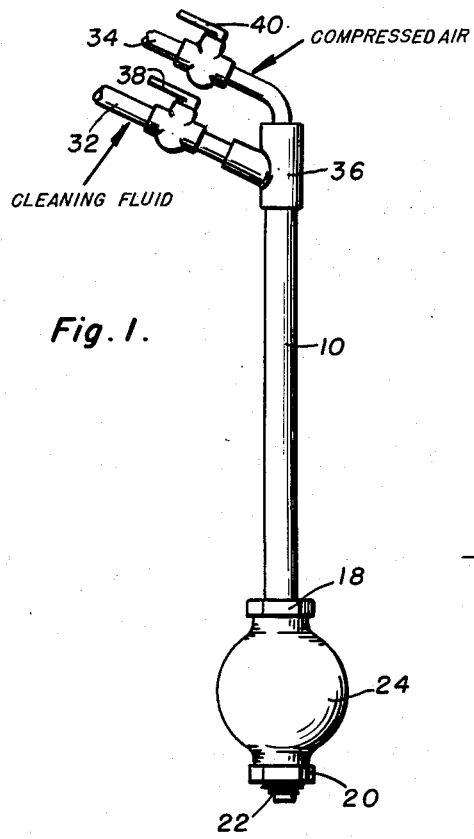
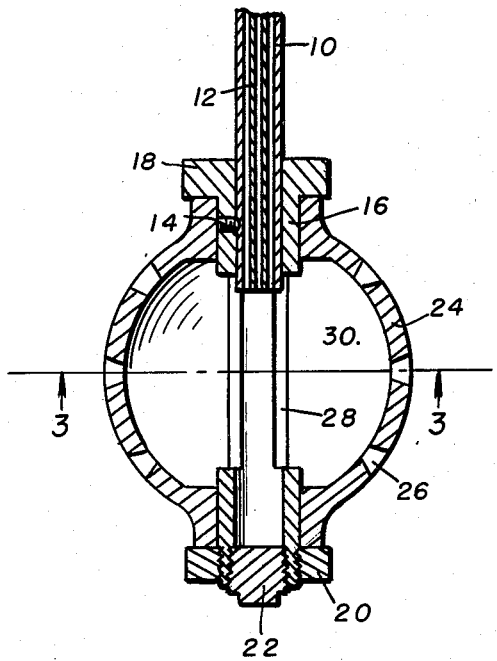
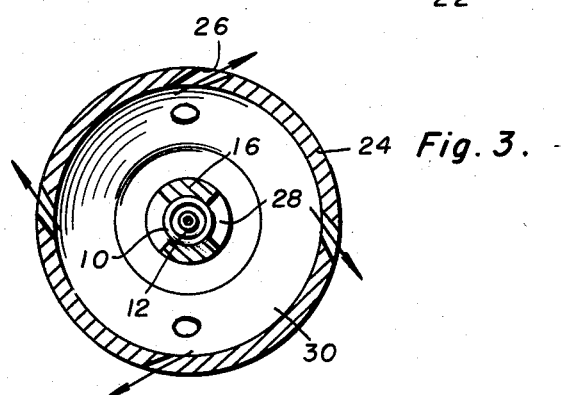
Inventor
Chauncey J. Nulph
By Clarence A. O'Brien
and Harvey B. Jacobson
Attorneys

Patented Oct. 17, 1950

2,526,265

UNITED STATES PATENT OFFICE 2,526,265

SPRAY HEAD

Chauncey J. Nulph, Weott, Calif.

Application June 23, 1947, Serial No. 756,465

1 Claim. (Cl. 299—69)

This invention relates to new and useful improvements in spray heads and the primary object of the present invention is to provide a rotatable spray head for cleaning cylinders and the like.

Another important object of the present invention is to provide a spray head including a plurality of jet discharge openings so designed as to spray a fluid from the head in all directions.

A further object of the present invention is to provide a rotary spray that is conveniently and readily applied to an air liquid pressure line to be rotated thereby.

A still further aim of the present invention is to provide a spray head that is simple and practical in construction, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Fig. 1 is a side elevational view of the present invention showing the same applied to a liquid line and compressed air line and with parts of the lines broken away and shown in section;

Fig. 2 is an enlarged vertical sectional view taken substantially on a plane through the center of Fig. 1 and with parts of the shank broken away and shown in section; and Fig. 3 is a horizontal sectional view taken substantially on the plane of sectional line 3—3 of Fig. 2.

Referring now to the drawings in detail, wherein for the purpose of illustration, there is disclosed a preferred embodiment of the present invention, the numeral 10 represents a tubular shank that embraces an inner tubing 12 with the terminal end of tubing 12 terminating coplanar with the terminal end of the shank.

Removably secured to the lower end of shank 10 by a set screw or the like 14 is a bearing sleeve 16 having a flanged portion 18 at its upper end and a nut 20 receivably engaged at its lower externally threaded end.

Extending through the aperture in nut 20 is an externally threaded closing plug 22 that receivably engages the internal threads at the lower end of sleeve 16.

Journaled for rotation on sleeve 16 and between flange 18 and nut 20 is a spherical body or spray head 24 of any suitable material and having a plurality of jet discharge openings or apertures 26 about its periphery.

A pair of opposed vertical and arcuate slots 28 provided in sleeve 16 enter into the chamber 30 of body 24.

In practical use of the device, tubing 12 is connected to a fluid line 32 and shank 10 is connected to a compressed air line 34. This may be accomplished by a T joint 36 as shown in Fig. 1 of the drawings although any other suitable means may be employed without deviating from the scope of the present invention.

As the valves 38 and 40 controlling lines 32 and 34 are turned on the fluid and air will be forced through the tubing 12 and shank 10, through slits 28, and hence into chamber 30. Obviously as the chamber becomes filled the fluid and compressed air will be expelled through jet discharge openings 26 which will impart a rotary movement of the spray head.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An apparatus for cleaning cylinders comprising an elongated tubular shank having inner and outer end portions, a bearing sleeve embracing the outer end of said shank and projecting outwardly from said shank, means securing said sleeve to the outer end portion of said shank, said sleeve having a pair of diametrically opposed longitudinal slots therein, a flange at the inner end of said sleeve and a nut threaded on the outer end of said sleeve, a spherical member embracing said sleeve and including hub portions bearing against said flange and said nut, said spherical member including a plurality of jet discharge openings, a plug closing the outer end of said sleeve, an inner tube coaxial with said shank and spaced from the inner periphery of said shank, said inner tube including an outer end portion coplanar with the outer end portion of said shank, means for supplying compressed air to said shank, and means for supplying a cleaning fluid to said inner tube.

CHAUNCEY J. NULPH.

REFERENCES CITED

The following references are of record in the file of this patent:

UNITED STATES PATENTS

| Number | Name | Date |
|---|---|---|
| 203,069 | Pennington et al. | Apr. 30, 1878 |
| 1,978,721 | Perkins | Oct. 30, 1934 |
| 2,110,044 | Jarvis | Mar. 1, 1938 |
| 2,194,095 | Noss | Mar. 19, 1940 |